(12) United States Patent
Bernat et al.

(10) Patent No.: US 11,218,538 B2
(45) Date of Patent: Jan. 4, 2022

(54) TECHNOLOGIES FOR PROVIDING FUNCTION AS SERVICE TIERED SCHEDULING AND MAPPING FOR MULTI-OPERATOR ARCHITECTURES

(71) Applicant: Intel Corporation, Santa Clara, CA (US)

(72) Inventors: Francesc Guim Bernat, Barcelona (ES); Ned Smith, Beaverton, OR (US); Evan Custodio, Seekonk, MA (US); Suraj Prabhkaran, Aachen (DE); Ignacio Astilleros Diez, Madrid (ES)

(73) Assignee: INTEL CORPORATION, Santa Clara, CA (US)

( * ) Notice: Subject to any disclaimer, the term of this patent is extended or adjusted under 35 U.S.C. 154(b) by 146 days.

(21) Appl. No.: 16/234,865

(22) Filed: Dec. 28, 2018

(65) Prior Publication Data
US 2019/0141121 A1    May 9, 2019

(51) Int. Cl.
| H04L 12/927 | (2013.01) |
| H04L 29/08 | (2006.01) |
| H04L 12/24 | (2006.01) |
| H04L 12/14 | (2006.01) |
| H04M 15/00 | (2006.01) |

(52) U.S. Cl.
CPC ...... *H04L 67/1008* (2013.01); *H04L 12/1492* (2013.01); *H04L 41/5006* (2013.01); *H04L 41/5051* (2013.01); *H04L 47/808* (2013.01); *H04L 67/16* (2013.01); *H04L 67/2809* (2013.01); *H04L 67/322* (2013.01);
(Continued)

(58) Field of Classification Search
CPC . H04L 67/1008; H04L 41/5006; H04L 67/16; H04L 12/1492; H04L 47/808; H04L 41/5051; H04L 67/322; H04L 67/327; H04L 67/2809; H04M 15/49; H04M 15/805
See application file for complete search history.

(56) References Cited

U.S. PATENT DOCUMENTS

| 9,002,932 | B2 * | 4/2015 | Wang | H04L 12/66 709/203 |
| 2006/0218127 | A1 * | 9/2006 | Tate | G06F 9/5055 |

(Continued)

*Primary Examiner* — Andrew C Georgandellis
(74) *Attorney, Agent, or Firm* — Hanley, Flight & Zimmerman, LLC

(57) ABSTRACT

Technologies for determining a set of edge resources to offload a workload from a client compute device based on a brokering logic provided by a service provider include a device that includes circuitry that is in communication with edge resources. The circuitry is to receive a brokering logic from a service provider receive a request from a client compute device, wherein the request includes a function to be used to execute the request and one or more parameters associated with the client compute device, determine the one or more parameters, select, as a function of the one or more parameters and the brokering logic, a physical implementation to perform the function, wherein the physical implementation indicates a set of edge resources and a performance level for each edge resource of the set of edge resources, and perform, in response to a selection of the physical implementation, the request using the set of edge resources associated with the physical implementation.

20 Claims, 6 Drawing Sheets

(52) U.S. Cl.
CPC .......... *H04L 67/327* (2013.01); *H04M 15/49* (2013.01); *H04M 15/805* (2013.01)

(56) References Cited

U.S. PATENT DOCUMENTS

| | | | |
|---|---|---|---|
| 2010/0121684 A1* | 5/2010 | Morio | G06Q 10/06311 |
| | | | 705/7.13 |
| 2015/0067019 A1* | 3/2015 | Balko | H04L 67/10 |
| | | | 709/202 |
| 2018/0020062 A1* | 1/2018 | Li | H04L 67/146 |

* cited by examiner

TECHNOLOGIES FOR PROVIDING FUNCTION AS SERVICE TIERED SCHEDULING AND MAPPING FOR MULTI-OPERATOR ARCHITECTURES

BACKGROUND

Typically, a compute device may execute an application using resources that are local to the compute device, such as a general purpose processor and/or one or more accelerator devices (e.g., devices capable of executing a set of operations faster than the general purpose processor). In some scenarios, a compute device may encounter a section of an application that should be performed within a certain set of parameters (e.g., the section is particularly sensitive to latency, such as a section that is to make decisions based on real time computer vision data, and should be performed within a particular time period) but is unable to satisfy those parameters due to limitations of the compute device. For example, the compute device might not be equipped with a fast enough general purpose processor or an appropriate accelerator device, or the compute device may not have enough energy stored in its battery to execute the section within the specified time period (e.g., utilizing the accelerator device would deplete the remaining energy in the battery).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
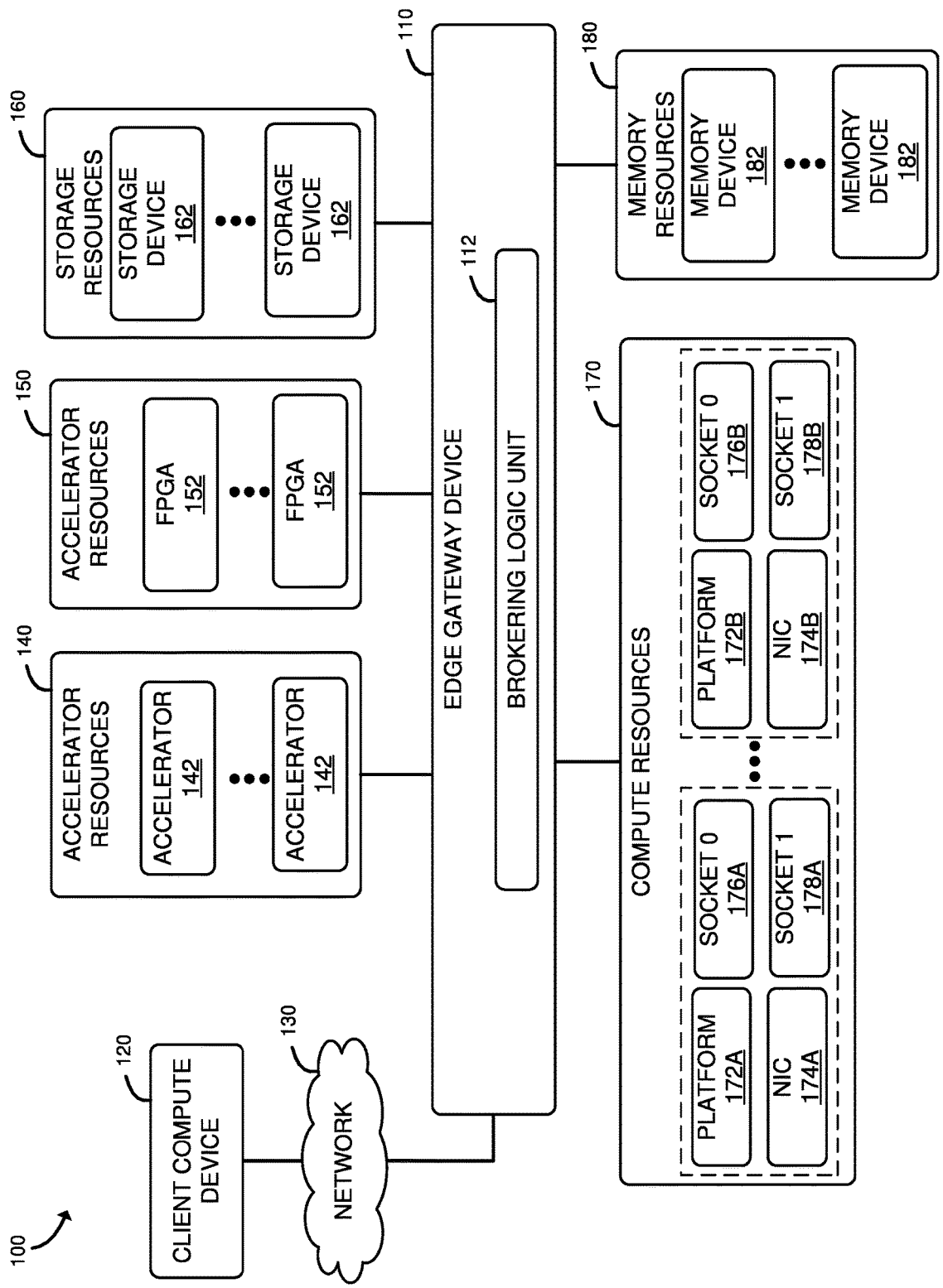
FIG. 1 is a simplified diagram of at least one embodiment of a system for determining a set of edge resources to offload a workload from a client compute device based on a brokering logic provided by a service provider.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. Furthermore, the disclosed embodiments may be initially encoded as a set of preliminary instructions (e.g., encoded on a machine-readable storage medium) that may require a preliminary processing operations to prepare the instructions for execution on a destination device. The preliminary processing may include combining the instructions with data present on a device, translating the instructions to a different format, performing compression, decompression, encryption, and/or decryption, combining multiple files that include different sections of the instructions, integrating the instructions with other code present on a device, such as a library, an operating system, etc., or similar operations. The preliminary processing may be performed by the source compute device (e.g., the device that is to send the instructions), the destination compute device (e.g., the device that is to execute the instructions), or an intermediary device. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for determining a set of edge resources to offload a workload from a client compute device based on a brokering logic provided by a service provider includes an edge gateway device 110 in communication with the client compute device 120. The edge gateway device 110 may be embodied as any device capable of communicating data between the client compute device 120 and one or more edge resources 140, 150, 160, 170, 180 (e.g., resources, such as compute devices and the components thereof, owned and/or operated by one or more service providers, such as cellular network operators) or other compute devices located in a cloud. The edge gateway device 110 and the edge resources 140, 150, 160, 170, 180, in the illustrative embodiment, are positioned at one or more locations (e.g., in small cell(s), base station(s), etc.) along the edge (e.g., in an edge network) of a cloud. In some embodiments, the edge gateway device 110 may be positioned at a core data center. It should be appreciated that the edge gateway device 110 and one or more edge resources 140, 150, 160, 170, 180 may be positioned at different locations.

The edge gateway device 110, in the illustrative embodiment, is configured to receive and respond to requests from the client compute device 120 to offload a workload to the edge resources 140, 150, 160, 170, 180, such as accelerator resources 140, 150, storage resources 160, compute resources 170, memory resources 180 and/or other edge resources. To do so, the edge gateway device 110 includes a brokering logic unit 112, which may be embodied as any device (e.g., a field-programmable gate array (FPGA)) capable of scheduling a requested workload received from the client compute device 120 to a set of edge resources 140, 150, 160, 170, 180. In use, the brokering logic unit 112 may determine the set of edge resources 140, 150, 160, 170, 180 that is capable of performing the requested workload based on requirements indicated by the client compute device 120 (e.g., a function required to perform the requested workload, acceptable latency requirement to perform the requested workload, a service level agreement, costs (e.g., monetary costs) associated with utilizing those edge resources 140, 150, 160, 170, 180 to perform the requested workload, and/or a list of acceptable service provider(s) of the edge resources). To do so, the brokering logic unit 112 receives a brokering logic from one or more service providers that own or operate the one or more edge resources 140, 150, 160, 170, 180. Each service provider may provide its own brokering logic that is to be used to determine a physical implementation of the function to perform a requested workload. For example, the physical implementation of the function indicates a set of edge resources and an operating mode (e.g., a performance level) for each edge resource.

An edge network may be embodied as any type of network that provides edge computing and/or storage resources which are proximately located to radio access network (RAN) capable endpoint devices (e.g., mobile computing devices, Internet of Things (IoT) devices, smart devices, etc.). In other words, the edge network is located at an "edge" between the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Accordingly, the edge network can provide a radio access interface to enterprise applications (e.g., housed in a remote cloud, data center, etc.) and/or other network-based services, as well as bring storage/compute resources closer to the endpoint devices. As some computations/processing can be performed at the edge networks, efficiencies such as reduced latency, bandwidth, etc., can be realized (i.e., relative to such computations/processing being performed at a remote cloud, data center, etc.). Depending on the intended purpose/capabilities of the edge network, the edge network may include one or more edge computing devices, which may include one or more gateways, servers, mobile edge computing (MEC) appliances, etc. It should be appreciated that, in some embodiments, the edge network may form a portion of or otherwise provide an ingress point into a fog network (e.g., fog nodes), which may be embodied as a system-level horizontal architecture that distributes resources and services of computing, storage, control and networking anywhere between a core data center (e.g., a data center that is further away from and in a higher level of a hierarchy of the system 100 than the edge resources 140, 150, 160, 170, 180, and that includes multiple compute devices capable of executing one or more services (e.g., processes on behalf of one or more clients)) and an endpoint device (e.g., the client compute device 120).

Figure 2:
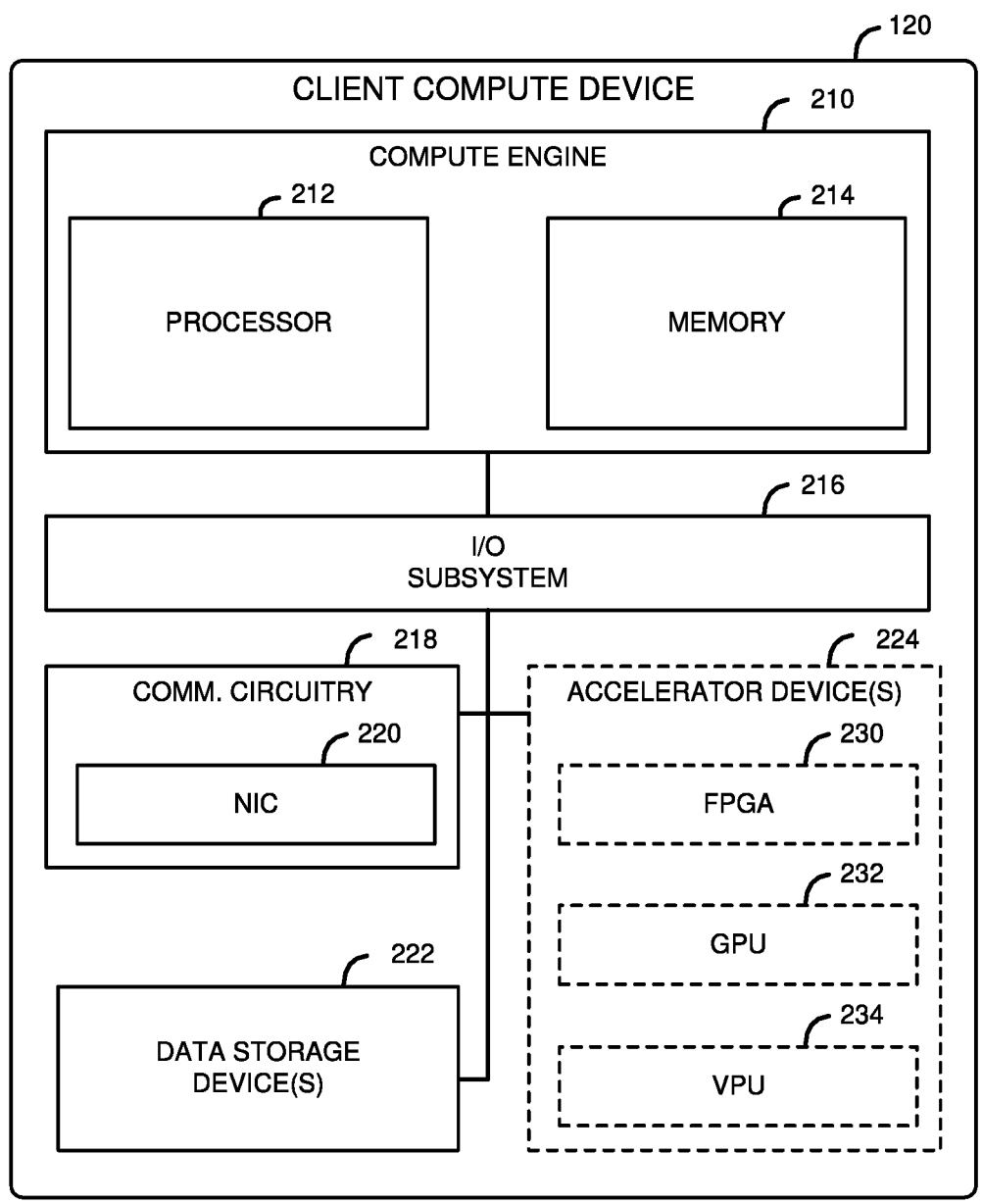
FIG. 2 is a simplified block diagram of at least one embodiment of a client compute device included in the system of FIG. 1.
Figure 3:
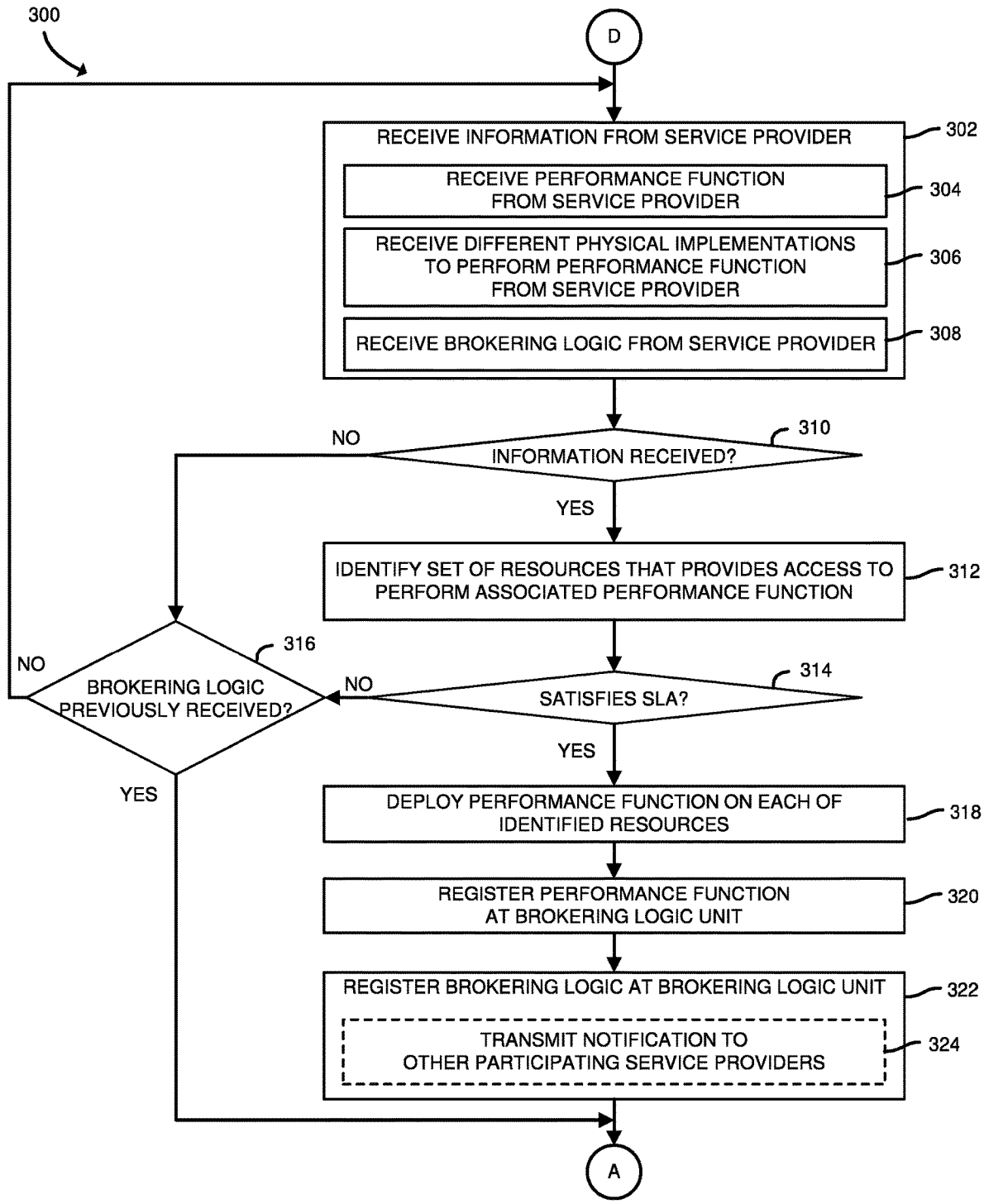
FIGS. 3-6 are a simplified block diagram of at least one embodiment of a method that may be performed by an edge gateway device of FIG. 1 for determining a physical implementation of a function to perform a requested workload from a client compute device.

Referring now to FIG. 2, the illustrative client compute device 120 includes a compute engine (also referred to herein as "compute engine circuitry") 210, an input/output (I/O) subsystem 216, communication circuitry 218, and one or more data storage devices 222. As described herein, the client compute device 120 may also include one or more accelerator devices 224. Of course, in other embodiments, the client compute device 120 may include other or additional components, such as those commonly found in a computer (e.g., a display, peripheral devices, etc.). Additionally, in some embodiments, one or more of the illustrative components may be incorporated in, or otherwise form a portion of, another component. The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. In the illustrative embodiment, the compute engine 210 includes or is embodied as a processor 212 and a memory 214, described above with reference to FIG. 1. The processor 212 may be embodied as any type of processor capable of performing the functions described herein. For example, the processor 212 may be embodied as a multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, or other specialized hardware to facilitate performance of the functions described herein.

The main memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the main memory 214 may be integrated into the processor 212. In operation, the main memory 214 may store various software and data used during operation such as one or more applications (the application 114), data operated on by the application(s), libraries, and drivers.

The compute engine 210 is communicatively coupled to other components of the client compute device 120 via the I/O subsystem 216, which may be embodied as circuitry and/or components to facilitate input/output operations with the compute engine 210 (e.g., with the processor 212 and/or the main memory 214) and other components of the client compute device 120. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the main memory 214, and other components of the client compute device 120, into the compute engine 210.

The communication circuitry 218 may be embodied as any communication circuit, device, or collection thereof, capable of enabling communications over a network between the client compute device 120 and another compute device (e.g., the edge gateway device 110, the edge resources 140, 150, 160, 170, 180, etc.). The communication circuitry 218 may be configured to use any one or more communication technology (e.g., wired or wireless communications) and associated protocols (e.g., a cellular networking protocol, Wi-Fi®, WiMAX, Ethernet, Bluetooth®, etc.) to effect such communication.

The illustrative communication circuitry 218 includes a network interface controller (NIC) 220, which may also be referred to as a host fabric interface (HFI). The NIC 220 may be embodied as one or more add-in-boards, daughter cards, network interface cards, controller chips, chipsets, or other devices that may be used by the client compute device 120 to connect with another compute device (e.g., the edge gateway device 110, the edge resources 140, 150, 160, 170, 180, etc.). In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the client compute device 120 at the board level, socket level, chip level, and/or other levels.

The one or more illustrative data storage devices 222 may be embodied as any type of devices configured for short-term or long-term storage of data such as, for example, memory devices and circuits, memory cards, hard disk drives, solid-state drives, or other data storage devices. Each data storage device 222 may include a system partition that stores data and firmware code for the data storage device 222. Each data storage device 222 may also include one or more operating system partitions that store data files and executables for operating systems.

Each accelerator device(s) 224 may be embodied as any device(s) or circuitries configured to execute a set of operations faster than the processor 212 is capable of executing the operations. The accelerator device(s) 224 may include one or more field programmable gate arrays (FPGAs) 230, each of which may be embodied as a set (e.g., a matrix) of logic gates that can be configured to perform a set of operations according to a defined configuration (e.g., a bit stream). The accelerator device(s) 224 may additionally or alternatively include a graphics processing unit (GPU) 232, which may be embodied as any device or circuitry (e.g., a programmable logic chip, a processor, etc.) configured to perform graphics-related computations (e.g., matrix multiplication, vector operations, etc.). Additionally or alternatively, the accelerator device(s) 224 may include a vision processing unit (VPU) 234, which may be embodied as any device or circuitry (e.g., a programmable logic chip, a processor, etc.) configured to perform operations related to machine vision, machine learning, and artificial intelligence.

The edge resources 150, 152, 154 (e.g., the compute devices 160, 162, 164, 166, 168, 170) and the edge gateway device 110 may have components similar to those described in FIG. 2 with reference to the client compute device 120. The description of those components of the client compute device 120 is equally applicable to the description of components of the edge resources 140, 150, 160, 170, 180 (e.g., the accelerator resources 140, 150, the storage resources 160, the compute resources 170, and the memory resources 180) and the edge gateway device 110. Further, it should be appreciated that any of the edge resources 140, 150, 160, 170, 180 and the edge gateway device 110 may include other components, sub-components, and devices commonly found in a computing device, which are not discussed above in reference to the client compute device 120 and not discussed herein for clarity of the description. Further, it should be understood that one or more components of a compute device may be distributed across any distance, and are not necessarily housed in the same physical unit.

The client compute device 120, edge resources 140, 150, 160, 170, 180 and the edge gateway device 110 are illustratively in communication via a network, which may be embodied as any type of wired or wireless communication network, including global networks (e.g., the Internet), local area networks (LANs) or wide area networks (WANs), an edge network, a fog network, cellular networks (e.g., Global System for Mobile Communications (GSM), 3G, Long Term Evolution (LTE), Worldwide Interoperability for Microwave Access (WiMAX), etc.), a radio access network (RAN), digital subscriber line (DSL) networks, cable networks (e.g., coaxial networks, fiber networks, etc.), or any combination thereof.

Referring now to FIGS. 3-6, the brokering logic unit 112 of the edge gateway device 110, in operation, may execute a method 300 for determining a physical implementation of a function to perform a requested workload from the client compute device 120. The method 300 begins with block 302, in which the brokering logic unit 112 receives information from a service provider. To do so, the brokering logic unit 112 receives a performance function from the service provider as indicated in block 304. The performance function indicates a function that is required to execute the request (e.g., a portion of application to be performed by a set of edge resources) from the client compute device 120. For example, the application running on the client compute device 120 may require a set of edge resources to perform an acceleration sensitive function or a compute and memory sensitive function. If the performance function is to be used with the client compute device 120 that is embodied as a smart car, the performance function may define a set of accelerator resources to perform a real-time processing to support an acceleration sensitive application (e.g., autonomous driving).

In block 306, the brokering logic unit 112 further receives from the service provider different physical implementations to perform the performance function. As discussed above, each physical implementation of the performance function may indicate a set of edge resources and an operating mode (e.g., a performance level) for each edge resource to be used to perform the performance function. For example, the service provider may define different performance levels (e.g., different latency requirement for different application) of the same performance function (e.g., to provide different cost options to perform the function). In block 308, the brokering logic unit 112 receives a brokering logic from the service provider. The brokering logic defines an algorithm that is to be used to determine which physical implementation should be used to perform the performance function. As discussed further below, the brokering logic unit 112 selects a physical implementation to perform an offloaded workload (e.g., a portion of an application that is running on the client compute device 120) requested from the client compute device 120 using the brokering logic and parameters indicated by the client compute device 120.

It should be appreciated that, although information is described as being received from a single service provider in method 300, the brokering logic unit 112 may receive information (e.g., one or more functions, physical implementations of each function, and a brokering logic associated with each service provider) from multiple service providers.

If the brokering logic unit 112 determines that the information has not been received in block 310, the method 300 skips ahead to block 316 to further determine whether a brokering logic associated with any service provider has been previously received. If not, the method 300 loops back to block 302 to continue to await information from a service provider. If, however, the brokering logic unit 112 determines that the brokering logic has been previously received from a service provider, the method 300 skips ahead to block 324 of FIG. 4, which is discussed further below.

Referring back to block 310, if the brokering logic unit 112 received the information from the service provider, the method 300 advances to block 312. In block 312, the brokering logic unit 112 identifies a set of resources that provides access to perform the associated performance function. As discussed above, the service provider may own or operate one or more edge resources that may be positioned at one or more data centers. In block 314, the brokering logic unit 112 determines whether a service level agreement between the service provider and the identified edge resources is satisfied.

If the brokering logic unit 112 determines that the service level agreement is not satisfied, the method advances to block 316. As discussed above, in block 316, the brokering logic unit 112 determines whether a brokering logic associated with any service provider has been previously received. If not, the method 300 loops back to block 302 to continue to await information from a service provider. If, however, the brokering logic unit 112 determines that the brokering logic has been previously received from a service provider, the method 300 skips ahead to block 324 of FIG. 4, which is discussed further below.

Referring back to block 314, if the brokering logic unit 112 determines that the service level agreement is satisfied, the method 300 skips ahead to block 318, in which the brokering logic unit 112 deploys the performance function on each of the identified resources as indicated. Subsequently or concurrently, the brokering logic unit 112 registers the performance function and the brokering logic at the brokering logic unit 112, as indicated in blocks 318 and 320, respectively. It should be appreciated that it may be stored at any component of the edge gateway device 110. In some embodiments, the brokering logic unit 112 may transmit a notification to other service providers participating in the infrastructure (e.g., to guarantee that a load balancing and brokering scheme is fair and validated).

Figure 4:
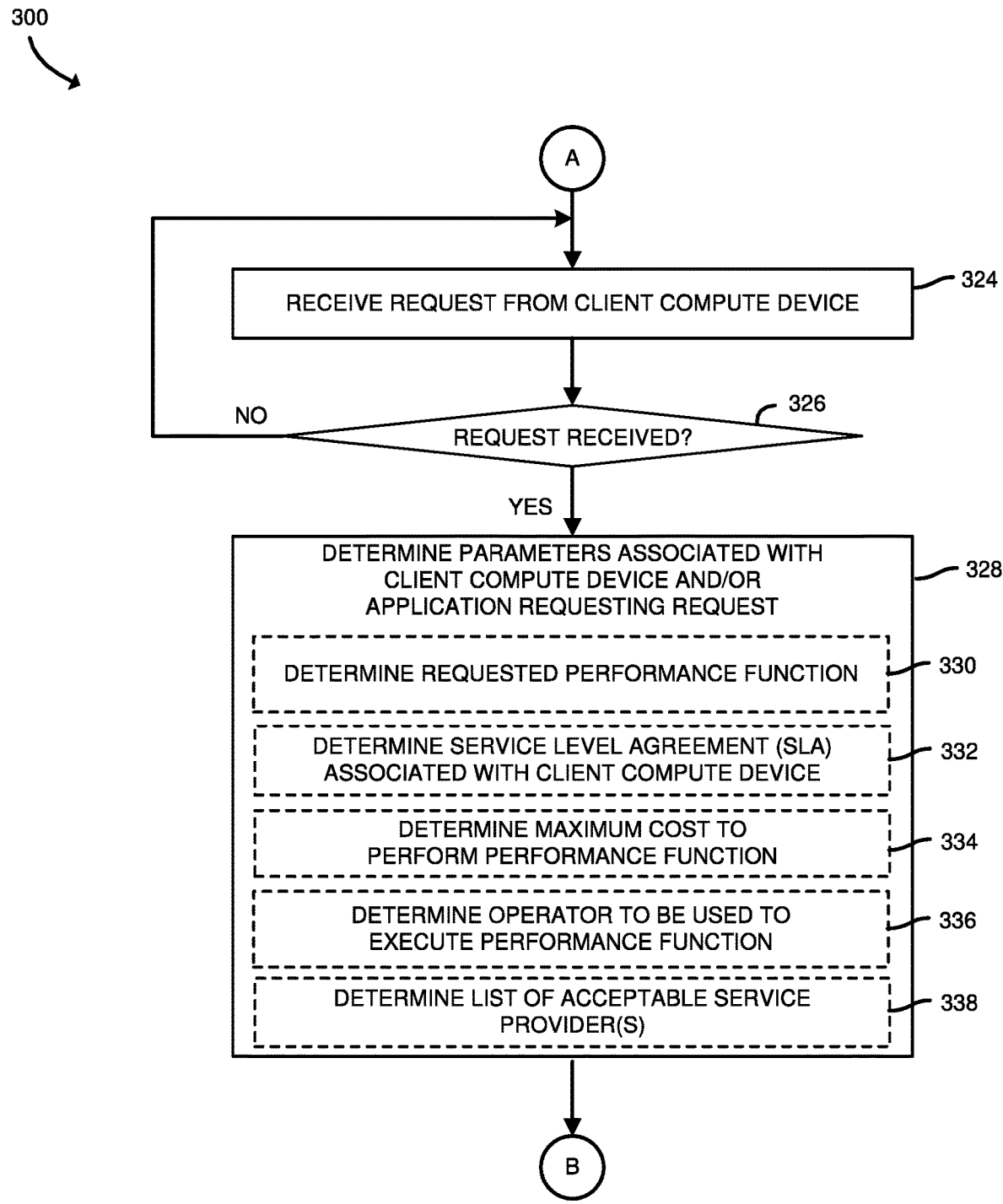

Referring now to block 324 of FIG. 4, the brokering logic unit 112 receives a request from a client compute device 120. For example, the request includes a section of an application that is requested to be offloaded to a set of edge resources for execution. If the brokering logic unit 112 determines that a request has not been received in block 326, the method 300 loops back to block 302 to continue determine whether information has been received from a service provider. If, however, the brokering logic unit 112 determines that a request has been received, the method 300 advances to block 328.

In block 328, the brokering logic unit 112 determines one or more parameters associated with the client compute device 120 and/or an application running on the client compute device 120 that is providing the request. For example, the parameters may include a requested performance function, a service level agreement (SLA) associated with the client compute device 120, a maximum cost to perform the requested performance function, a list of acceptable service providers. Accordingly, in some embodiments, the brokering logic unit 112 may determine a performance function that is being requested by the client compute device 120 as indicated in block 330. Additionally or alternatively, the brokering logic unit 112 may determine a service level agreement (SLA) that is associated with the requesting client compute device 120 as indicated in block 332. Additionally or alternatively, the brokering logic unit 112 may determine a maximum cost to perform the requested performance function indicated by the client compute device 120 as indicated in block 334. Additionally or alternatively, the brokering logic unit 112 may determine a service provider to be used to execute the requested performance function as indicated in block 336. For example, the request from the client compute device 120 may include a list of acceptable service providers.

Figure 5:
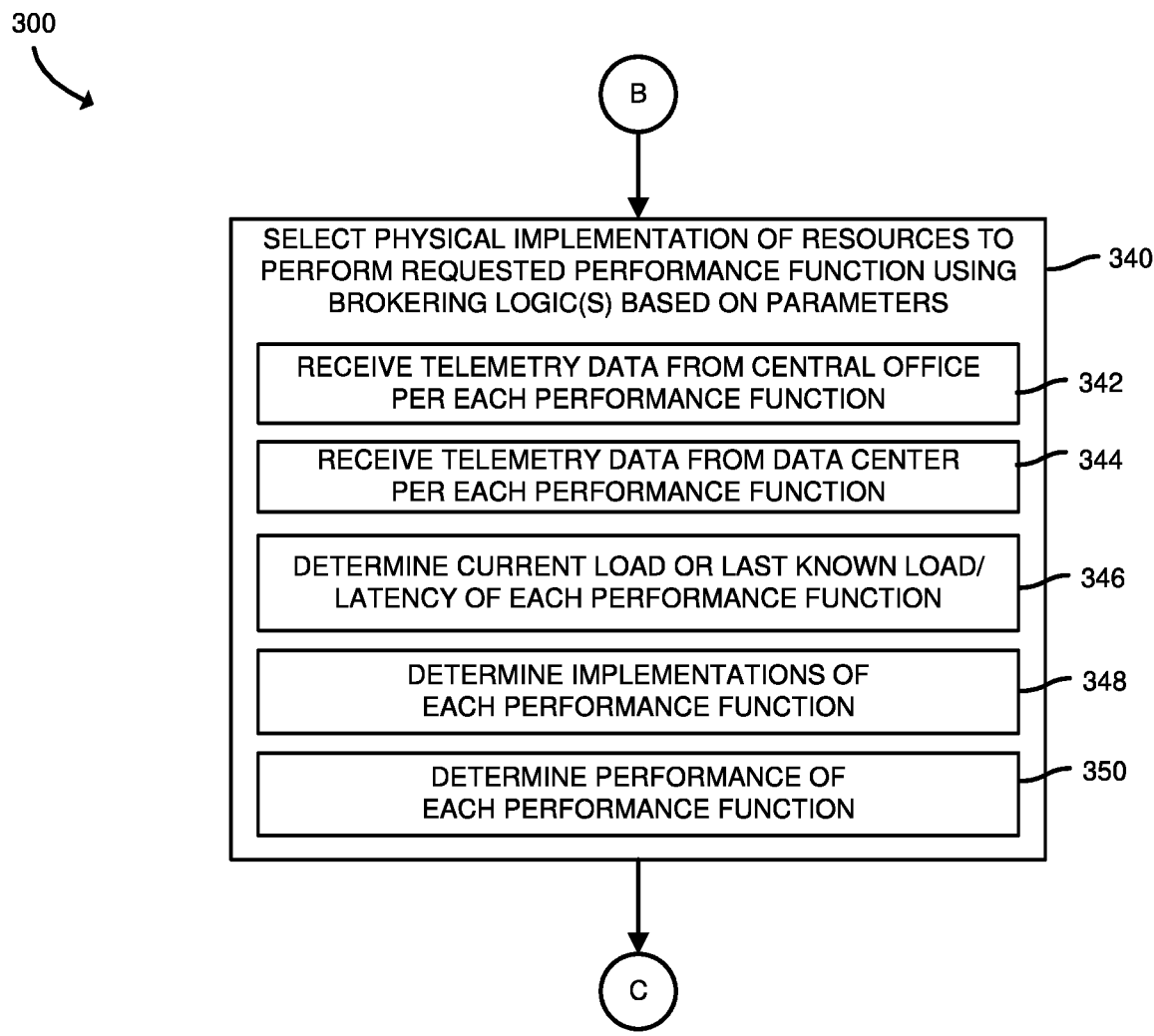

Subsequently, in block 338 of FIG. 5, the brokering logic unit 112 selects a physical implementation to perform the requested performance function based on the parameters indicated by the client compute device 120 using one or more brokering logics that are registered at the brokering logic unit 112. To do so, for each performance function, the brokering logic unit 112 may receive telemetry data from a central office (e.g., a central data center) as indicated in block 340. Additionally or alternatively, as indicated in block 342, the brokering logic unit 112 may receive telemetry data from one or more data centers (e.g., where edge resources for the requested performance function are positioned). The telemetry data for the performance function may indicate a current load (or last known load and last known latency), one or more physical implementations of the performance function, and a performance level of each physical implementation. Accordingly, from the telemetry data, the brokering logic unit 112 may determine a current load or last known load or latency of the requested performance function as indicated in block 344. Additionally or alternatively, the brokering logic unit 112 may determine different physical implementations of the requested performance function as indicated in block 346. Additionally or alternatively, the brokering logic unit 112 may determine performance of the requested performance function as indicated in block 348.

Figure 6:
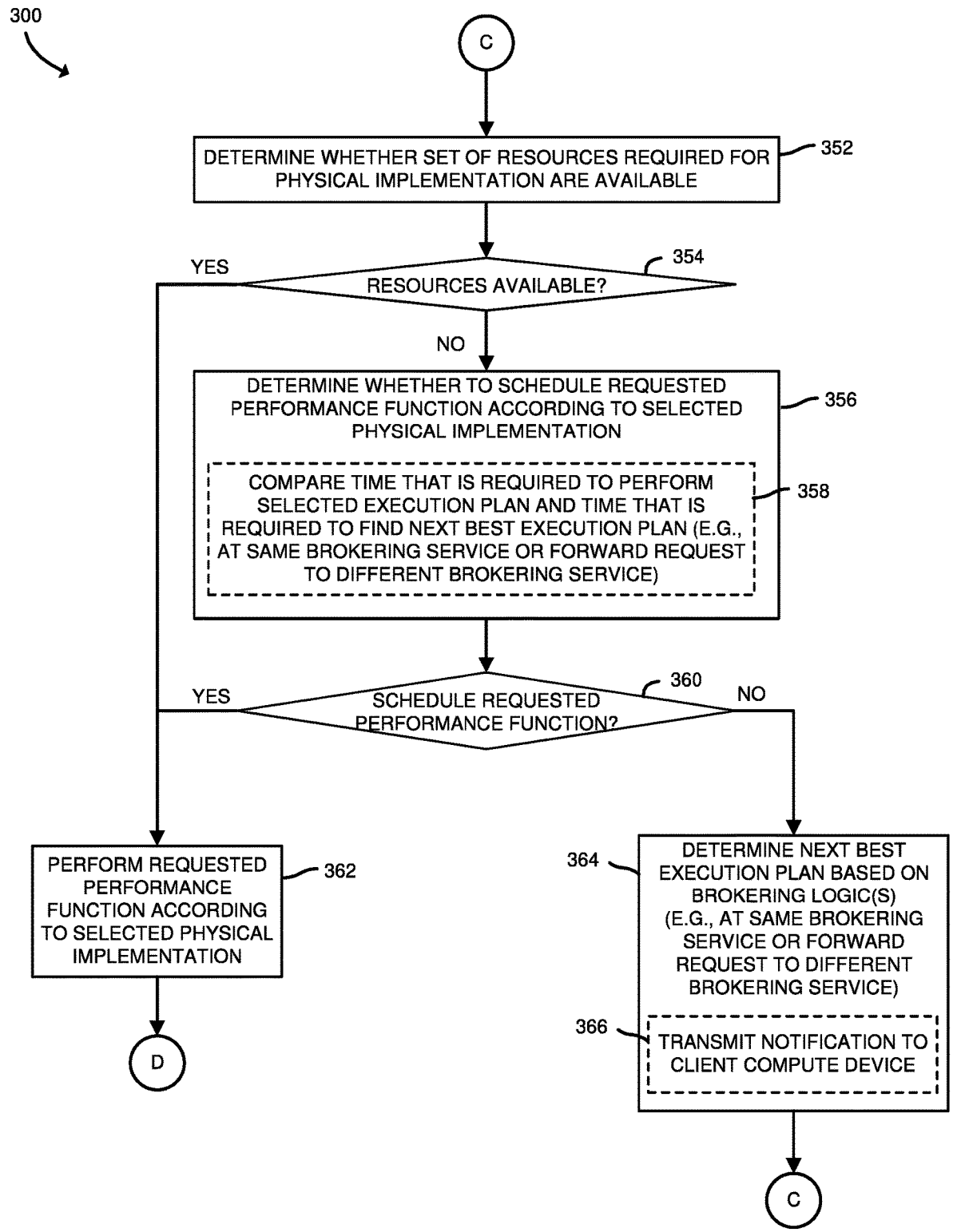

Once the physical implementation to perform the requested performance function is selected, the method 300 advances to block 350 of FIG. 6. In block 350, the brokering logic unit 112 determines whether a set of edge resources of the selected physical implementation are indeed available to perform the requested performance function. If the brokering logic unit 112 determines that the edge resources are available in block 352, the method skips ahead to block 360 to perform the requested performance function according to the selected physical implementation. If, however, the brokering logic unit 112 determines that the edge resources of the selected physical implementation are not available (e.g., due to saturation of edge resources), the method 300 advances to block 354.

In block 354, the brokering logic unit 112 determines whether to schedule the requested performance function according to the selected physical implementation when the edge resources are not immediately available. To do so, in some embodiments, the brokering logic unit 112 may compare time that is required to perform the requested performance function according to the selected physical implementation (e.g., wait time) and time that is required to find a next best physical implementation (e.g., routing time) as indicated in block 356. It should be appreciated that the brokering logic unit 112 may determine a next best physical implementation at the same edge gateway device 110 or may forward the request received from the client compute device 120 to a different edge gateway device to determine a next best physical implementation to perform the requested performance function.

If the wait time is shorter than the routing time, the brokering logic unit 112 determines to schedule the requested performance function according to the selected physical implementation in block 358. Subsequently, the method 300 advances to block 360 to perform the requested performance function according to the selected physical implementation. Subsequently, the method 300 loops back to block 302 to continue to await information from a service provider to update performance function(s) and brokering logic(s) registered at the edge gateway device 110.

If, however, the wait time is longer than the routing time, the brokering logic unit 112 determines not to schedule the requested performance function according to the selected physical implementation in block 358. Instead, the brokering logic unit 112 determines a next best physical implementation based on the brokering logics at the same edge gateway device. Alternatively, in some embodiments, the brokering logic unit 112 may forward the request to a different edge gateway device to determine a next best physical implementation based on one or more brokering logics registered at that edge gateway device. Subsequently, the method 300 loops back to block 350 to determine whether a set of edge resources of the next best physical implementation is available.

EXAMPLES

Illustrative examples of the technologies disclosed herein are provided below. An embodiment of the technologies may include any one or more, and any combination of, the examples described below.

Example 1 includes a device comprising circuitry in communication with edge resources, wherein the circuitry is to receive a brokering logic from a service provider; receive a request from a client compute device, wherein the request includes a function to be used to execute the request and one or more parameters associated with the client compute device; determine the one or more parameters; select, as a function of the one or more parameters and the brokering logic, a physical implementation to perform the function, wherein the physical implementation indicates a set of edge resources and a performance level for each edge resource of the set of edge resources; and perform, in response to a selection of the physical implementation, the request using the set of edge resources associated with the physical implementation.

Example 2 includes the subject matter of Example 1, and wherein the request includes a section of an application to be executed by one or more edge resources.

Example 3 includes the subject matter of any of Examples 1 and 2, and wherein the circuitry is further to receive data indicative of one or more functions and different physical implementations of each function.

Example 4 includes the subject matter of any of Examples 1-3, and wherein the one or more parameters include a service level agreement associated with the client compute device, a maximum cost to perform the function, and/or a list of acceptable service providers.

Example 5 includes the subject matter of any of Examples 1-4, and wherein the circuitry is further to receive telemetry data of the function to determine a current load or last known load of the function, different physical implementations of the function, and/or performance of the function.

Example 6 includes the subject matter of any of Examples 1-5, and wherein the performance of the function includes a latency of each edge resource associated with the different physical implementations of the function.

Example 7 includes the subject matter of any of Examples 1-6, and wherein the circuitry is further to determine whether the set of edge resources of the selected physical implementation is available to perform the function.

Example 8 includes the subject matter of any of Examples 1-7, and wherein the circuitry is further to determine, in response to a determination that the set of edge resources is not available, a next best physical implementation to perform the function.

Example 9 includes the subject matter of any of Examples 1-8, and wherein the edge resources include one or more accelerator devices, one or more compute devices, one or more storage devices, and/or one or more memory resources.

Example 10 includes a method comprising receiving, by an edge gateway device, a brokering logic from a service provider; receiving, by the edge gateway device, a request from a client compute device, wherein the request includes a function to be used to execute the request and one or more parameters associated with the client compute device; determining, by the edge gateway device, the one or more parameters; selecting, as a function of the one or more parameters and the brokering logic and by the edge gateway device, a physical implementation to perform the function, wherein the physical implementation indicates a set of edge resources and a performance level for each edge resource of the set of edge resources; and performing, in response to a selection of the physical implementation and by the edge gateway device, the request using the set of edge resources associated with the physical implementation.

Example 11 includes the subject matter of Example 10, and wherein the request includes a section of an application to be executed by one or more edge resources.

Example 12 includes the subject matter of any of Examples 10 and 11, and further including receiving, by the edge gateway device, data indicative of one or more functions and different physical implementations of each function.

Example 13 includes the subject matter of any of Examples 10-12, and wherein the one or more parameters include a service level agreement associated with the client compute device, a maximum cost to perform the function, and/or a list of acceptable service providers.

Example 14 includes the subject matter of any of Examples 10-13, and further including receiving, by the edge gateway device, telemetry data of the function to determine a current load or last known load of the function, different physical implementations of the function, and/or performance of the function.

Example 15 includes the subject matter of any of Examples 10-14, and wherein the performance of the function includes a latency of each edge resource associated with the different physical implementations of the function.

Example 16 includes the subject matter of any of Examples 10-15, and further including determining, by the edge gateway device, whether the set of edge resources of the selected physical implementation is available to perform the function.

Example 17 includes the subject matter of any of Examples 10-16, and further including determining, in response to determining that the set of edge resources is not available and by the edge gateway device, a next best physical implementation to perform the function.

Example 18 includes the subject matter of any of Examples 10-17, and wherein the edge resources include one or more accelerator devices, one or more compute devices, one or more storage devices, and/or one or more memory resources.

Example 19 includes one or more machine-readable storage media comprising a plurality of instructions stored thereon that, after being prepared for execution, cause a compute device that executes the prepared instructions to receive a brokering logic from a service provider; receive a request from a client compute device, wherein the request includes a function to be used to execute the request and one or more parameters associated with the client compute device; determine the one or more parameters; select, as a function of the one or more parameters and the brokering logic, a physical implementation to perform the function, wherein the physical implementation indicates a set of edge resources and a performance level for each edge resource of the set of edge resources; and perform, in response to a selection of the physical implementation, the request using the set of edge resources associated with the physical implementation.

Example 20 includes the subject matter of Example 19, and further including a plurality of instructions that in response to being executed cause the compute device to receive data indicative of one or more functions and different physical implementations of each function, wherein the one or more parameters include a service level agreement associated with the client compute device, a maximum cost to perform the function, and/or a list of acceptable service providers.

What is claimed is:

1. A device comprising:
    communication circuitry to:
        access, from a service provider, data indicative of a function, different physical implementations of the function, and a brokering logic; and
        access a request from a client compute device;
    processor circuitry in communication with edge resources, wherein the processor circuitry is to:
        determine the function to be used to execute the request and one or more parameters associated with the client compute device;
        select, based on the one or more parameters and the brokering logic, a first of the physical implementations, wherein the first physical implementation includes a first set of the edge resources and defines a performance level for a first edge resource of the first set of the edge resources;
        determine a wait time for the first physical implementation to become available to perform the function;
        in response to determining the wait time is greater than zero, determine a predicted routing time to find, based on the one or more parameters and the brokering logic, a second physical implementation, wherein the second physical implementation includes a second set of the edge resources and defines a performance level for a second edge resource of the second set of the edge resources;
        select one of the first physical implementation or the second physical implementation to perform the function based on a comparison of the wait time and the predicted routing time; and
        perform the function in response to the request using the corresponding one of the first set of the edge resources or the second set of the edge resources associated with the determined one of the first physical implementation or the second physical implementation.

2. The device of claim 1, wherein the request includes a section of an application to be executed by one or more edge resources.

3. The device of claim 1, wherein the circuitry is further to receive data indicative of one or more functions and different physical implementations of each function.

4. The device of claim 1, wherein the one or more parameters include a service level agreement associated with the client compute device, a maximum cost to perform the function, and/or a list of acceptable service providers.

5. The device of claim 1, wherein the circuitry is further to receive telemetry data of the function to determine a current load or last known load of the function, the different physical implementations of the function, and/or performance of the function.

6. The device of claim 5, wherein the performance of the function includes a latency of each edge resource associated with the different physical implementations of the function.

7. The device of claim 1, wherein the circuitry is further to determine whether the first set of the edge resources of the selected physical implementation is available to perform the function.

8. The device of claim 7, wherein the circuitry is further to determine, in response to a determination that the first set of the edge resources is not available, a next best physical implementation to perform the function.

9. The device of claim 1, wherein the edge resources include one or more accelerator devices, one or more compute devices, one or more storage devices, and/or one or more memory resources.

10. A method comprising:
accessing, by an edge gateway device from a service provider, data indicative of a function, different physical implementations of the function, and a brokering logic;
accessing, by the edge gateway device, a request from a client compute device;
determining, by the edge gateway device, the function to be used to execute the request and one or more parameters associated with the client compute device;
selecting, based on the one or more parameters and the brokering logic, a first of the physical implementations, wherein the first physical implementation includes a first set of edge resources and defines a performance level for a first edge resource of the first set of the edge resources;
determining a wait time for the first physical implementation to become available to perform the function;
in response to determining the wait time is greater than zero, determining a predicted routing time to find, based on the one or more parameters and the brokering logic, a second physical implementation, wherein the second physical implementation includes a second set of the edge resources and defines a performance level for a second edge resource of the second set of the edge resources;
selecting one of the first physical implementation or the second physical implementation to perform the function based on a comparison of the wait time and the predicted routing time; and
performing the function in response to the request using the corresponding one of the first set of the edge resources or the second set of the edge resources associated with the determined one of the first physical implementation or the second physical implementation.

11. The method of claim 10, wherein the request includes a section of an application to be executed by one or more edge resources.

12. The method of claim 10, wherein the accessed data is further indicative of one or more functions and different physical implementations of each function.

13. The method of claim 10, wherein the one or more parameters include a service level agreement associated with the client compute device, a maximum cost to perform the function, and/or a list of acceptable service providers.

14. The method of claim 10 further comprising receiving, by the edge gateway device, telemetry data of the function to determine a current load or last known load of the function, different physical implementations of the function, and/or performance of the function.

15. The method of claim 14, wherein the performance of the function includes a latency of each edge resource associated with the different physical implementations of the function.

16. The method of claim 10 further comprising determining, by the edge gateway device, whether the first set of the edge resources of the selected physical implementation is available to perform the function.

17. The method of claim 16 further comprising determining, in response to determining that the first set of the edge resources is not available and by the edge gateway device, a next best physical implementation to perform the function.

18. The method of claim 17, wherein the edge resources include one or more accelerator devices, one or more compute devices, one or more storage devices, and/or one or more memory resources.

19. One or more non-transitory machine-readable storage media comprising a plurality of instructions stored thereon that, in response to being executed, cause a device to:
access, from a service provider, data indicative of a function, different physical implementations of the function, and a brokering logic; and
access a request from a client compute device;
determine the function to be used to execute the request and one or more parameters and associated with the client compute device;
select, based on the one or more parameters and the brokering logic, a first of the physical implementations, wherein the first physical implementation includes a first set of edge resources and defines a performance level for a first edge resource of the first set of the edge resources;
determine a wait time for the first physical implementation to become available to perform the function;
in response to determining the wait time is greater than zero, determine a predicted routing time to find, based on the one or more parameters and the brokering logic, a second physical implementation, wherein the second physical implementation includes a second set of the edge resources and defines a performance level for a second edge resource of the second set of the edge resources;
select one of the first physical implementation or the second physical implementation to perform the function based on a comparison of the wait time and the predicted routing time; and
perform the function in response to the request using the corresponding one of the first set of the edge resources or the second set of the edge resources associated with the determined one of the first physical implementation or the second physical implementation.

20. The one or more non-transitory computer-readable storage media of claim 19, the accessed data is further indicative of one or more functions and different physical implementations of each function, and wherein the one or more parameters include a service level agreement associated with the client compute device, a maximum cost to perform the function, and/or a list of acceptable service providers.

* * * * *